May 15, 1928.

E. COLE

TIDE MOTOR

Filed March 1, 1926

1,670,140

Inventor

Edward Cole, deceased,
Jeannette Cole, Administratrix

By Frederick W. Hunker

Attorney

Patented May 15, 1928.

1,670,140

UNITED STATES PATENT OFFICE.

EDWARD COLE, DECEASED, LATE OF NEW YORK, N. Y., BY JEANNETTE COLE, ADMINISTRATRIX, OF NEW YORK, N. Y.

TIDE MOTOR.

Application filed March 1, 1926. Serial No. 91,592.

This invention relates generally to an improved method and means for obtaining useful power from tides and its principal object is to provide an improved system whereby the movement of the tides may be utilized to furnish a continuous supply of power during the ebb and flow of the tide.

For this purpose in the preferred embodiment of his invention he employs a supply reservoir and a discharge reservoir, the former of which is adapted to receive tide water and the latter of which is adapted to receive water from the supply reservoir together with means located between the supply and discharge reservoirs for converting the energy of flow from the supply to the discharge reservoir into useful available energy. Such a means may be a water wheel, low head turbine or other prime mover which may be coupled to an electric generator for the purpose of furnishing electric energy. The supply reservoir is provided with a gate ir similarly controlled inlet for the purpose of admitting to the supply reservoir water during the flow of the tide, and the discharge reservoir is provided with a similar gate for permitting the discharge of water from such reservoir during low tide. Likewise in the preferred embodiment of his invention the discharge of water from the supply reservoir to the discharge reservoir through the prime mover is controlled in response to the level of water in the supply reservoir or to the difference in levels of water in the supply and discharge reservoirs in such a manner that the prime mover will be properly supplied with water and that at all times it will operate with a high degree of efficiency.

Preferably but not necessarily the discharge reservoir will be of greater capacity than the supply reservoir so that a certain supply of water discharged into the discharge reservoir will not rise to as great a height as it would in the supply reservoir and preferably the supply reservoir will further be so capacitated and the times and rates of admission of water thereto and discharge of water therefrom will be so proportioned as to produce a continuous motion of the prime mover during both the ebb and the flow of the tide.

Other objects and advantages of his invention will appear from the following description taken in connection with the accompanying drawing which shows one embodiment of his invention and wherein Figure 1 is a vertical section showing diagrammatically the supply reservoir, discharge reservoir, the various inlets and outlets and the power generating means located between the two reservoirs.

Figure 1:
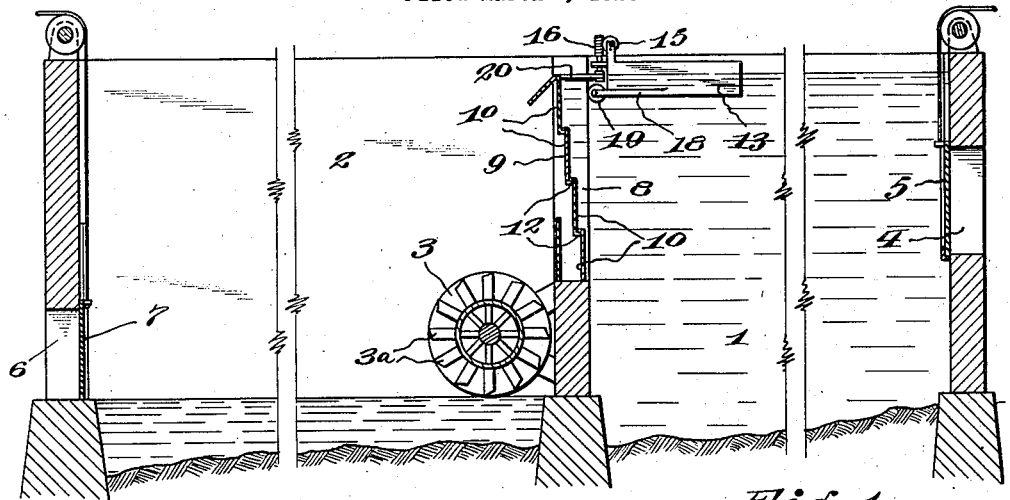
Figure 2:
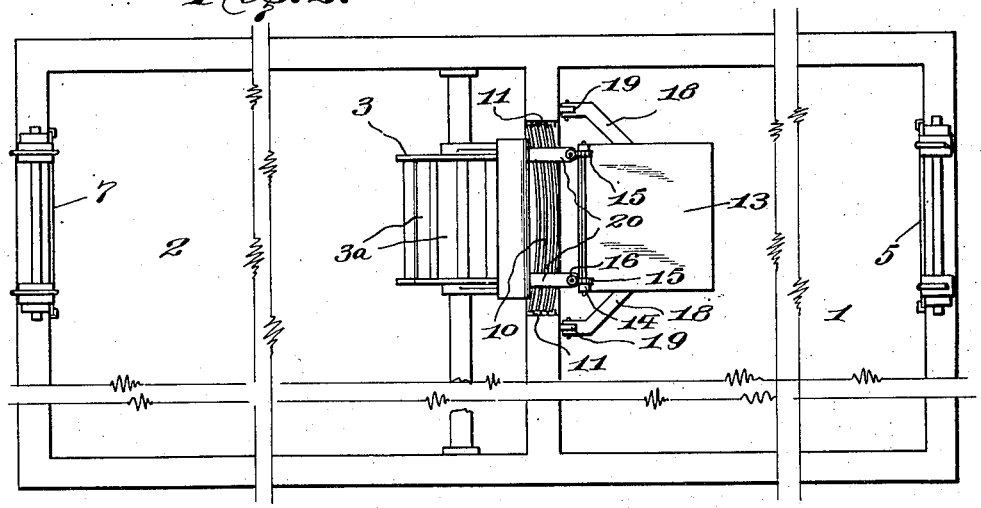
Figure 2 is a plan view partly broken away, of the structure shown in Figure 1.
Figure 4:
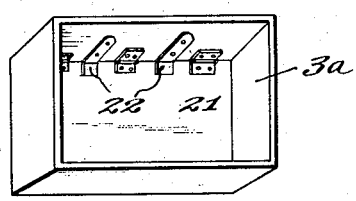
Figure 4 is a detailed view of one of the buckets of the water wheel shown in Figures 1 and 2.

Referring more particularly to Figures 1 and 2 of the drawing, 1 indicates the supply reservoir, 2 a discharge reservoir and 3 a prime mover which as shown is a water wheel but which it will be understood may be any well known type of prime mover such as a low head turbine. The reservoirs may be of any suitable structure. They may be composed of a plurality of artificial side walls although in many cases it will be understood that the shore due to its topography may form natural walls for the reservoirs. Preferably the discharge reservoir has a greater capactiy than the supply reservoir so that a given volume of water will rise say only half as high in the discharge reservoir as in the supply reservoir. The supply reservoir is provided with one or a plurality of inlets as 4 formed in one or more of its side walls which side walls may be in the form of a dam across the mouth of a bay or other inlet forming the supply reservoir. These inlets have gates 5 which are adapted to be opened or closed at will. It is desirable that the inlets be positioned not lower than the mean height of the water outside the reservoir, that is, half way between high tide and low tide. If positioned lower than the mean water level they will in general be opened only when the level of the water is not lower than the mean level. The discharge reservoir is provided with one or more outlets (6) similarly constructed to the inlets 4 of the supply reservoir and outlets 6 are controlled by gates 7 adapted to be opened and closed at will. The gates 7 are preferably located below the mean height of the water outside as near to the level of low ebb tide as possible. The water wheel is positioned below the discharge opening 8 from the supply to the discharge reservoir. There may of course be several openings such as 8 and several prime movers depending upon the quantity of water which is to be handled and the motor or motors 8 may be employed to drive an electric generator or generators not shown but which are constructed and connected to the motors or prime mover 8 in accordance with standard practice in hydraulic installations of this character.

Figure 3:
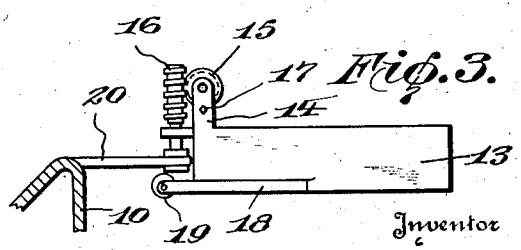
Figure 3 is a detailed view of the adjustable connection between the float which controls the supply of water to the prime mover and the water gates which are operated by the float.

Located in the opening 8 is a gate 9 which may be made as shown in telescoping sections 10 adapted to slide in stationary guides 11. These sections are preferably curved to better resist the pressure exerted by the water. Shoulders as 12 serve to interlock the sections so that a movement imparted to the uppermost section will cause the other sections to rise or fall in proper order. Attached to the uppermost section is a float 13 provided with arms 14 carrying worm wheels 15 which engage worms 16 on vertical shafts attached to their lower ends to a projection 20 secured to the uppermost section 10. By turning the worm wheels 15 the position of the gate relative to the float may be adjusted and by this means the position of the top of the top section 10 of the gate may be adjusted relatively to the water level in the supply reservoir and the volume of water passing over the gate into the discharge reservoir may be regulated. This furnishes a means for insuring a constant supply of water or of power to the motor 3 during a change in the levels of water in the reservoirs or of varying the supply of water or power in accordance with requirements. The wheels 15 may be locked so as to prevent their turning on the arm 14, by means of a key 17 as shown in Figure 3. If desired the worm 16 may be swivelled in the projection 20 and extend upward a considerable distance above the float so as to be readily accessible from the top of the opening 8 a pinned rod being used to lock the worm in position on the projection 20. When the worm is turned from above with the wheel locked the gate 9 will be raised or lowered relative to the float. The float 13 is provided with rods 18 which serve as brace rods and which if desired may be provided with antifriction rollers 19 to assist the rise and fall of the float. When a water wheel such as is shown at 3 is employed this wheel may be of any suitable structure but preferably the buckets 20 thereof have hinged bottoms 21 normally held closed by springs 22 but which are adapted to be opened inwardly by water in the discharge reservoir should the latter rise to the level of the water wheel.

The operation is as follows: Assume that the tide has risen to its full height. During the rise of the tide the outlet 6 from the discharge reservoir is kept closed so that no water enters except from what is received from the supply reservoir. During the rise of the tide the inlet 4 to the supply reservoir is kept open so as to supply water to the water wheel and turbine and also for the purpose of gradually increasing the height of water in the supply reservoir. When high tide has been reached the inlet to the supply reservoir is closed. During the time that the water has risen in the supply reservoir a constant stream will have passed through the opening 8 the volume of which at any time depends upon the adjustment of the sections of the gate 9 and the float 13. The water in thus passing over the gate 9 will impinge against the wheel 3 causing it to turn and thereby generating power. The flow of the water over the gate 9 during this period is however less than the influx of water produced by the inflowing tide. The supply reservoir therefore gradually fills up.

This rise of water has the effect of causing the float 13 to rise thereby drawing up the sections of the gate 9 at the same time however allowing a constant stream to escape over the gate 9. As the tide begins to fall the inlet to the supply reservoir as previously stated is closed thereby holding or retaining the water except as it escapes over the gate 9. Meanwhile the discharge reservoir is filling up but as this preferably has a much larger capacity than the supply reservoir the water will not rise very high in the discharge reservoir. When the ebb falls below the level of the water in the discharge reservoir the outlet therefrom is opened and the water emptied as the tide goes out. As soon as the tide begins to come in again the said outlet is closed. When the incoming tide reaches the level of the water in the supply reservoir which by this time has fallen considerably the inlet is opened again and the supply reservoir is replenished.

The capacity of the supply reservoir and the volume of water which escapes over the gate 9 should preferably be so proportioned that sufficient water will be stored in said reservoir to operate the water wheel from the time the inlet is closed until it is opened again. As the level of the water falls in the supply reservoir the float will lower the gate 9 thereby permitting a constant supply of water to flow to the wheel 3. The means for adjustment between the float and gate permits the control of the amount of water flowing to the wheel or turbine so as to insure a constant supply of power to the turbine or to permit the supply of water or power to be controlled at will in response to the requirements of the generating system. While he has disclosed a gate or abutment 9 over which the water flows to the prime mover 3 and he has also disclosed a direct mechanical connection between the float and the gate 9, it is obvious that in certain cases the supply of water to the prime mover may be directly controlled by an equivalent of the gate 9 such as a valve, and that the connection between the float and valve instead of being a direct mechanical connection may be a remote connection such as by means of an electrical circuit. Furthermore the means for altering the control which the float has on the gate which in the present disclosure is the worm wheel and worm connection may be considerably modified without departing from the spirit of the invention. Thus while he has disclosed the manual and mechanical operating means for adjustment of the gate and float, the adjustment may be a manually controlled electrical connection between these two elements. The control instead of being manual may be automatic in response to requirements of the system.

What is claimed is:

1. In a tide motor, the combination with a supply reservoir of a discharge reservoir, means for opening and closing the supply reservoir to receive and hold inflowing tide, means forming a passage between the two reservoirs, means embodying telescopic sections for controlling the flow of water through said passage, a float in said supply reservoir controlling said last named means so as to permit a constant flow through said passage, a stationary prime mover adapted to be operated by said flow and means for varying the effect which said float has on said flow.

2. In a tide motor, the combination with a supply reservoir, of a discharge reservoir, means for opening and closing the supply reservoir to receive and hold the inflowing tide. a movable gate comprising telescopic sections between the two reservoirs, a float in the supply reservoir controlling the gate so as to permit a constant stream of water to pass over said gate from the supply into the discharge reservoir, means of connection between the float and gate for raising or lowering the gate with respect to the float so as to regulate the flow of water over the gate, a motor journaled in fixed bearings in the discharge reservoir so as to receive the flow of water over the gate, the discharge reservoir being considerably larger in size than the supply reservoir so that the discharge of water from the supply into the discharge reservoir will effect but a comparatively slight rise in level of the water in the discharge reservoir, and means for opening and closing the discharge reservoir to prevent the tide from entering the same and to allow the water received from the supply reservoir to be emptied out during ebb.

3. A tide motor comprising a supply reservoir, a discharge reservoir of greater capacity than said supply reservoir, means of communication between said reservoirs, a gate comprising telescopic sections extensible vertically over said means of communication, a float in said supply reservoir, said float having means of engagement with said gate to control its height in accordance with the level of water in said supply reservoir, and a generator fixedly positioned in said discharge reservoir to constantly receive an operating flow of water passing over said gate.

JEANNETTE COLE,
*Administratrix Estate of Edward Cole, Deceased.*